(12) United States Patent
Yao et al.

(10) Patent No.: US 11,754,821 B2
(45) Date of Patent: Sep. 12, 2023

(54) FOLDED CAMERA

(71) Applicant: Apple Inc., Cupertino, CA (US)

(72) Inventors: Yuhong Yao, San Jose, CA (US); Miodrag Scepanovic, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/069,928

(22) Filed: Dec. 21, 2022

(65) Prior Publication Data

US 2023/0119451 A1    Apr. 20, 2023

Related U.S. Application Data

(63) Continuation of application No. 17/371,732, filed on Jul. 9, 2021, now Pat. No. 11,536,936, which is a (Continued)

(51) Int. Cl.
*G02B 17/08* (2006.01)
*G03B 13/36* (2021.01)
(Continued)

(52) U.S. Cl.
CPC ............ *G02B 17/08* (2013.01); *G02B 7/09* (2013.01); *G02B 7/102* (2013.01); *G02B 7/1805* (2013.01);
(Continued)

(58) Field of Classification Search
CPC ........ H04N 23/687; G02B 7/09; G02B 7/102; G02B 7/1805; G02B 9/34; G02B 9/60;
(Continued)

(56) References Cited

U.S. PATENT DOCUMENTS 2,649,022 A    8/1953  Angenieux
7,274,518 B1   9/2007  Tang et al.
(Continued)

FOREIGN PATENT DOCUMENTS

CN   103969915    8/2014
CN   106094244   11/2016
(Continued)

OTHER PUBLICATIONS

Examination Report from European 19705891.0, (Apple Inc.), dated Dec. 1, 2022, pp. 1-9.
(Continued)

*Primary Examiner* — Lin Ye
*Assistant Examiner* — Chriss S Yoder, III
(74) *Attorney, Agent, or Firm* — Robert C. Kowert; Kowert, Hood, Munyon, Rankin & Goetzel, P.C.

(57) ABSTRACT

A folded camera that includes two light folding elements such as prisms and an independent lens system, located between the two prisms, which includes an aperture stop and a lens stack. The lens system may be moved on one or more axes independently of the prisms to provide autofocus and/or optical image stabilization for the camera. The shapes, materials, and arrangements of the refractive lens elements in the lens stack may be selected to capture high resolution, high quality images while providing a sufficiently long back focal length to accommodate the second prism.

20 Claims, 15 Drawing Sheets

Related U.S. Application Data continuation of application No. 16/264,463, filed on Jan. 31, 2019, now Pat. No. 11,061,213.

(60) Provisional application No. 62/627,645, filed on Feb. 7, 2018.

(51) Int. Cl.

| | |
|---|---|
| *G03B 5/02* | (2021.01) |
| *G02B 9/34* | (2006.01) |
| *G02B 9/60* | (2006.01) |
| *G02B 7/09* | (2021.01) |
| *G02B 27/64* | (2006.01) |
| *G02B 13/00* | (2006.01) |
| *G02B 7/18* | (2021.01) |
| *G02B 13/04* | (2006.01) |
| *G02B 7/10* | (2021.01) |
| *H04N 23/68* | (2023.01) |

(52) U.S. Cl.
CPC ............... *G02B 9/34* (2013.01); *G02B 9/60* (2013.01); *G02B 13/004* (2013.01); *G02B 13/0045* (2013.01); *G02B 13/0065* (2013.01); *G02B 13/04* (2013.01); *G02B 27/646* (2013.01); *G03B 5/02* (2013.01); *G03B 13/36* (2013.01); *H04N 23/687* (2023.01); *G03B 2205/0007* (2013.01)

(58) Field of Classification Search
CPC ............ G02B 13/004; G02B 13/0045; G02B 13/0065; G02B 13/04; G02B 17/08; G02B 27/646; G03B 5/02; G03B 13/36; G03B 2205/0007
See application file for complete search history.

(56) References Cited

U.S. PATENT DOCUMENTS

| | | | |
|---|---|---|---|
| 7,646,418 | B2 | 1/2010 | Nanjo |
| 3,014,080 | A1 | 9/2011 | Chen et al. |
| 8,427,761 | B2 | 4/2013 | Yamada |
| 8,599,495 | B1 | 12/2013 | Tsai et al. |
| 8,837,929 | B2 | 9/2014 | Nomura et al. |
| 9,172,856 | B2 | 10/2015 | Bohn et al. |
| 9,274,311 | B2 | 3/2016 | Bone et al. |
| 9,374,516 | B2 | 6/2016 | Osborne |
| 9,549,107 | B2 | 1/2017 | Georgiev |
| 9,733,458 | B2 | 8/2017 | Georgiev et al. |
| 9,829,684 | B2 | 11/2017 | Shabtay et al. |
| 9,973,680 | B2 | 5/2018 | Osborne |
| 10,036,895 | B2 | 7/2018 | Avivi et al. |
| 10,070,060 | B2 * | 9/2018 | Goldenberg ........... G03B 13/36 |
| 10,139,594 | B2 | 11/2018 | Lin et al. |
| 10,156,706 | B2 | 12/2018 | Shabtay et al. |
| 10,288,897 | B2 | 5/2019 | Bachar et al. |
| 10,725,313 | B2 | 7/2020 | Sugawara |
| 11,061,213 | B2 | 7/2021 | Yao et al. |
| 11,314,147 | B1 | 4/2022 | Sharma et al. |
| 2004/0141065 | A1 | 7/2004 | Hara et al. |
| 2006/0092524 | A1 * | 5/2006 | Konno ............... G02B 13/0065 359/678 |
| 2012/0075728 | A1 | 3/2012 | Takakubo et al. |
| 2012/0249815 | A1 | 10/2012 | Bohn et al. |
| 2012/0314307 | A1 | 12/2012 | Ikushima et al. |
| 2013/0182336 | A1 | 7/2013 | Hsu et al. |
| 2013/0201559 | A1 | 8/2013 | Minamisawa et al. |
| 2013/0314307 | A1 | 11/2013 | Lin et al. |
| 2014/0218799 | A1 | 8/2014 | Suzuka |
| 2015/0286033 | A1 | 10/2015 | Osborne |
| 2015/0316748 | A1 | 11/2015 | Cheo et al. |
| 2015/0373252 | A1 | 12/2015 | Georgiev |
| 2016/0044247 | A1 | 2/2016 | Shabtay et al. |
| 2016/0266400 | A1 | 9/2016 | Chan et al. |
| 2016/0353008 | A1 | 12/2016 | Osborne |
| 2017/0038600 | A1 | 2/2017 | Hee et al. |
| 2017/0187962 | A1 | 6/2017 | Lee et al. |
| 2017/0329102 | A1 | 11/2017 | Yuza et al. |
| 2017/0359566 | A1 | 12/2017 | Goma et al. |
| 2017/0359568 | A1 | 12/2017 | Georgiev et al. |
| 2018/0017767 | A1 | 1/2018 | Chen |
| 2018/0017844 | A1 | 1/2018 | Yu et al. |
| 2018/0120674 | A1 | 5/2018 | Avivi et al. |
| 2018/0217475 | A1 | 8/2018 | Goldenberg et al. |
| 2018/0239162 | A1 | 8/2018 | Lee et al. |
| 2019/0094500 | A1 | 3/2019 | Tseng et al. |
| 2019/0196148 | A1 | 6/2019 | Yao et al. |
| 2019/0212632 | A1 | 7/2019 | Miller et al. |
| 2019/0227406 | A1 | 7/2019 | Wang et al. |
| 2019/0235202 | A1 | 8/2019 | Smyth et al. |
| 2020/0057313 | A1 | 2/2020 | Lee et al. |
| 2021/0026117 | A1 | 1/2021 | Yao et al. |
| 2021/0223662 | A1 | 7/2021 | Miller et al. |
| 2021/0333529 | A1 | 10/2021 | Yao et al. |
| 2021/0373279 | A1 | 12/2021 | Smyth et al. |

FOREIGN PATENT DOCUMENTS

| | | |
|---|---|---|
| CN | 106164732 | 11/2016 |
| CN | 106164766 | 11/2016 |
| CN | 205942054 | 2/2017 |
| CN | 106576138 | 4/2017 |
| CN | 107407849 | 11/2017 |
| CN | 107533208 | 1/2018 |
| CN | 107533273 | 1/2018 |
| JP | 2009526257 | 7/2009 |
| JP | 2013125057 | 6/2013 |
| JP | 2015179230 | 10/2015 |
| KR | 20170023430 | 3/2017 |
| KR | 20170105236 | 9/2017 |
| KR | 10-2017-0128612 | 11/2017 |
| TW | 200405028 | 4/2004 |
| WO | 2016024192 | 2/2016 |
| WO | 201607754 | 12/2016 |
| WO | 2017037688 | 3/2017 |
| WO | 2017084090 | 5/2017 |
| WO | 2018007981 | 1/2018 |
| WO | 2019140115 | 7/2019 |

OTHER PUBLICATIONS

International Search Report from PCT/US2019-016523, (Apple Inc.), dated May 8, 2019, pp. 1-10.
Written Opinion of the International Searching Authority from PCT/US2019/016523, dated Aug. 20, 2020, pp. 1-9.
Xu, Zhaolin, et al., "Autofocusing system based on optical autocollimating for aerial camera," Optical Instruments, Apr. 2011, pp. 52-56, vol. 33 No. 2.
International Search Report and Written Opinion dated Jul. 3, 2019 in PCT/US2019/016523, Apple Inc., pp. 1-15.
Office Action dated Feb. 16, 2022 in Chinese Patent Application No. 201980011847.0, pp. 1-18 (including translation).

* cited by examiner

FOLDED CAMERA

PRIORITY INFORMATION

This application is a continuation of U.S. patent application Ser. No. 17/371,732, filed Jul. 9, 2021, which is a continuation of U.S. patent application Ser. No. 16/264,463, filed Jan. 31, 2019, now U.S. Pat. No. 11,061,213, which claims benefit of priority of U.S. Provisional Application Ser. No. 62/627,645 entitled "FOLDED CAMERA" filed Feb. 7, 2018, the content of which are incorporated by reference herein in their entirety.

BACKGROUND

Technical Field

This disclosure relates generally to camera systems, and more specifically to small form factor camera and lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an imaging lens system that is capable of capturing high brightness, high resolution images under the physical constraints imposed by small form factor cameras.

SUMMARY OF EMBODIMENTS

Embodiments of the present disclosure may provide a folded camera that may, for example, be used in small form factor cameras. Embodiments of a folded camera are described that include two light folding elements (e.g., prisms) and an independent lens system located between the two prisms that includes an aperture stop and lens elements with refractive power mounted in a lens barrel. The prisms and lens system may collectively be referred to as an optical system. The prisms provide a "folded" optical axis for the camera, for example to reduce the Z-height of the camera. The lens system includes a lens stack including one or more refractive lens elements mounted in a lens barrel, and an aperture stop located at or in front of a first lens element in the stack. A first prism redirects light from an object field from a first axis (AX 1) to the lens system on a second axis (AX 2). The lens element(s) in the lens stack receive the light through the aperture stop and refract the light to a second prism that redirects the light onto a third axis (AX 3) on which a photosensor of the camera is disposed. The redirected light forms an image plane at or near the surface of the photosensor.

The shapes, materials, and arrangements of the refractive lens elements in the lens stack may be selected to capture high resolution, high quality images while providing a sufficiently long back focal length to accommodate the second prism. Parameters and relationships of the lenses in the lens stack, including but not limited to lens shape, thickness, geometry, position, materials, spacing, and the surface shapes of certain lens elements, may be selected at least in part to reduce, compensate, or correct for optical aberrations and lens artifacts and effects across the field of view. In some embodiments, arrangements of power distribution, lens shapes, prism form factors, and lens materials may be selected to ensure that embodiments of the lens system provide low F-number (e.g., <=2.4), 3× optical zoom, and high resolution imaging.

The lens system may be configured in the camera to move on one or more axes independently of the prisms. The camera may include an actuator component configured to move the lens system on (parallel to) the second axis (AX 2) relative to and independently of the prisms to provide autofocus functionality for the camera. In some embodiments, the actuator may instead or also be configured to move the lens system on one or more axes perpendicular to the second axis (AX 2) relative to and independently of the prisms to provide optical image stabilization (OIS) functionality for the camera. In some embodiments, one or both of the prisms may be translated with respect to the second axis (AX 2) independently of the lens system and/or tilted with respect to the second axis (AX 2) independently of the lens system, for example to provide OIS functionality for the camera or to shift the image formed at an image plane at the photosensor.

In some embodiments, the lens system may include a lens stack consisting of four lens elements with refractive power, in order from the object side to the image side of the camera: a first lens element with positive refractive power; a second lens element with positive refractive power; a third lens element with negative refractive power and an aspheric shape to correct chromatic aberration and field curvature; and a fourth lens element with a meniscus shape to correct field curvature and provide a low F-number.

In some embodiments, the lens system may include a lens stack consisting of five lens elements with refractive power, in order from the object side to the image side of the camera: a first lens element with positive refractive power; a second lens element with positive refractive power; a third lens element with negative refractive power and an aspheric shape to correct chromatic aberration and field curvature; a fourth aspheric lens element configured as an air-space doublet with the third lens element that assists in the aberration correction provided by the third lens element; and a fifth lens element with a meniscus shape to correct field curvature and provide a low F-number.

An aperture stop may be located in the lens system at the first lens element for controlling the brightness of the camera. Note that the power order, shape, or other optical characteristics of the refractive lens elements may be different in some embodiments, and some embodiments may include more or fewer refractive lens elements. In some embodiments, the folded camera may include an infrared (IR) filter to reduce or eliminate interference of environmental noise on the photosensor. The IR filter may, for example, be located between the second prism and the photosensor.

Figure 1A:
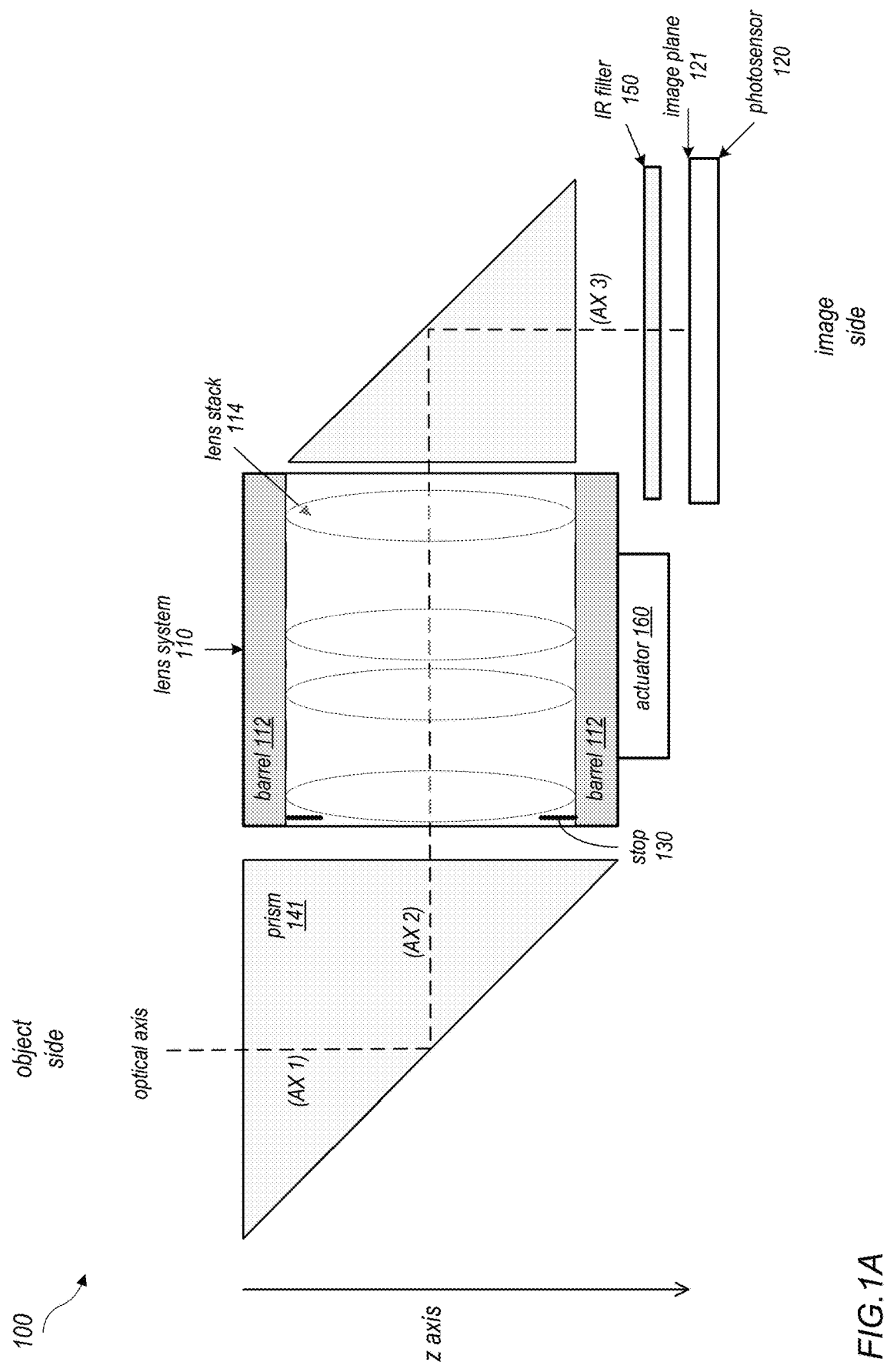
FIG. 1A illustrates components of a folded camera with two light folding elements and an independent lens system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a folded camera are described that include two light folding elements (e.g., prisms) and an independent lens system located between the two prisms that includes an aperture stop and lens elements with refractive power mounted in a barrel. The prisms and lens system may collectively be referred to as an optical system. FIG. 1A illustrates components of a folded camera 100 with two prisms 141 and 142, and an independent lens system 110, according to some embodiments. The prisms 141 and 142 provide a "folded" optical axis for the camera 100, for example to reduce the Z-height of the camera 100. The lens system 110 includes a lens stack 114 including one or more refractive lens elements mounted in a lens barrel 112, and an aperture stop 130 located at or in front of a first lens element in the stack 114. A first prism 141 redirects light from an object field from a first axis (AX 1) to the lens system 110 on a second axis (AX 2). The lens element(s) in the lens stack 114 receive the light through the aperture stop 130 and refract the light to a second prism 142 that redirects the light onto a third axis (AX 3) on which a photosensor 120 of the camera 100 is disposed. The redirected light forms an image at an image plane 121 at or near the surface of the photosensor 120.

The shapes, materials, and arrangements of the refractive lens elements in the lens stack 114 may be selected to capture high resolution, high quality images while providing a sufficiently long back focal length to accommodate the second prism 142. The camera 100 may, but does not necessarily, include an infrared (IR) filter 150, for example located between the second prism 142 and the photosensor 120.

Figure 1B:
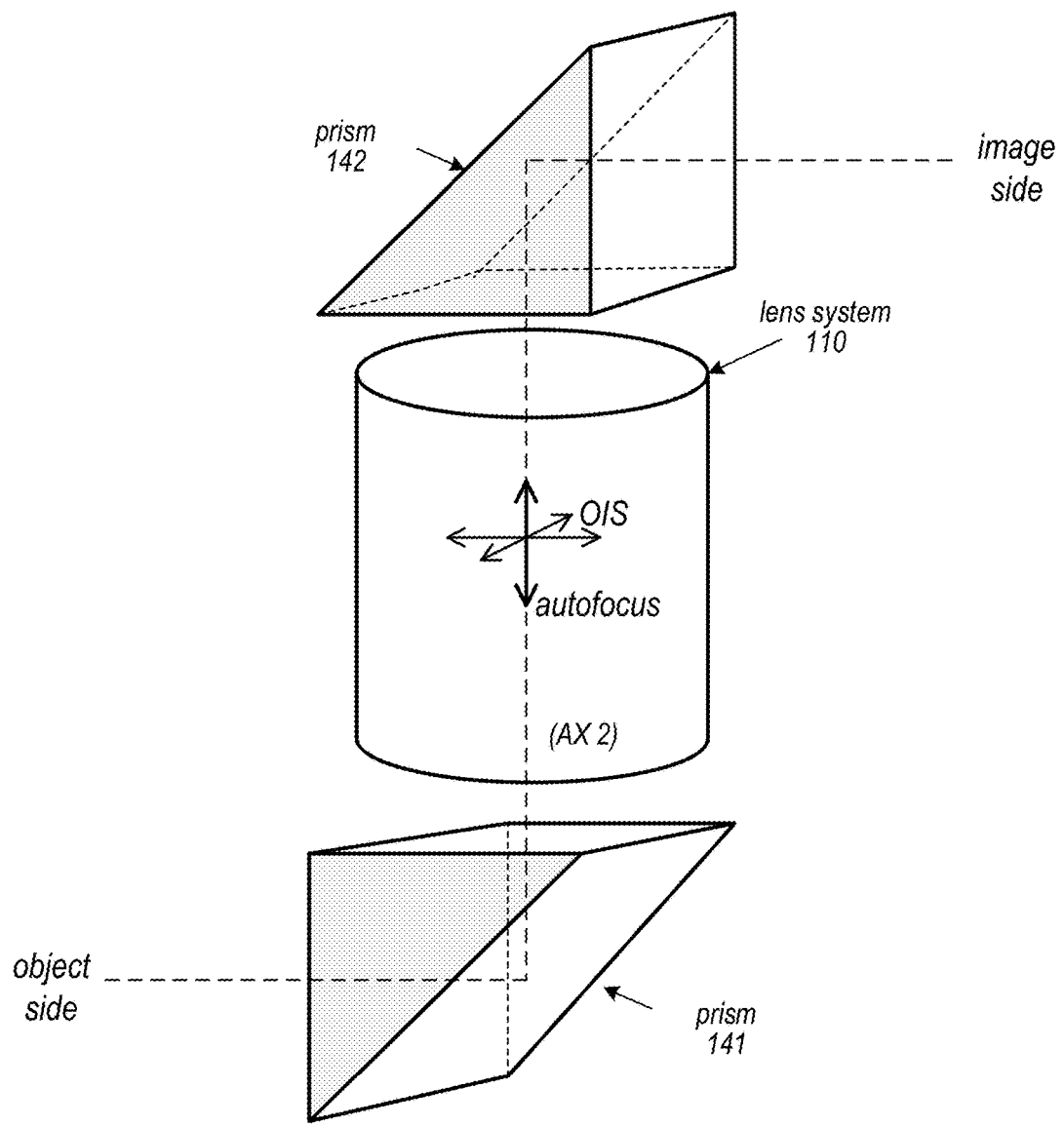
FIG. 1B illustrates movements of the lens system relative to the light folding elements in a camera as illustrated in FIG. 1A, according to some embodiments.

FIG. 1B illustrates movements of the lens system 110 independently of and relative to the prisms 141 and 142 in a camera 100 as illustrated in FIG. 1A, according to some embodiments. In some embodiments, the camera 100 may include an actuator 160 component or components configured to move the lens system 110 on (parallel to) the second axis (AX 2) relative to and independently of the prisms 141 and 142 to provide autofocus functionality for the camera 100. In some embodiments, the actuator 160 component(s) may instead or also be configured to move the lens system 110 on one or more axes orthogonal to the second axis (AX 2) relative to and independently of the prisms 141 and 142 to provide optical image stabilization (OIS) functionality for the camera 100. While not shown, in some embodiments, one or both of the prisms 141 and 142 may be translated with respect to the second axis (AX 2) independently of the lens system 110 and/or tilted with respect to the second axis (AX 2) independently of the lens system 110, for example to provide OIS functionality for the camera 100 or to shift the image formed at an image plane 121 at the photosensor 120.

Embodiments of a lens system for a folded camera as described herein are configured with a long back focal length (the distance from the last refractive lens element to the image plane) to provide space for a second light folding element (e.g., a second prism). In addition, arrangements of power distribution, lens shapes, prism form factors, and lens materials may be selected to ensure that embodiments of the lens system provide low F-number (e.g., <=2.4), 3× optical zoom, and high resolution imaging.

Figure 13:
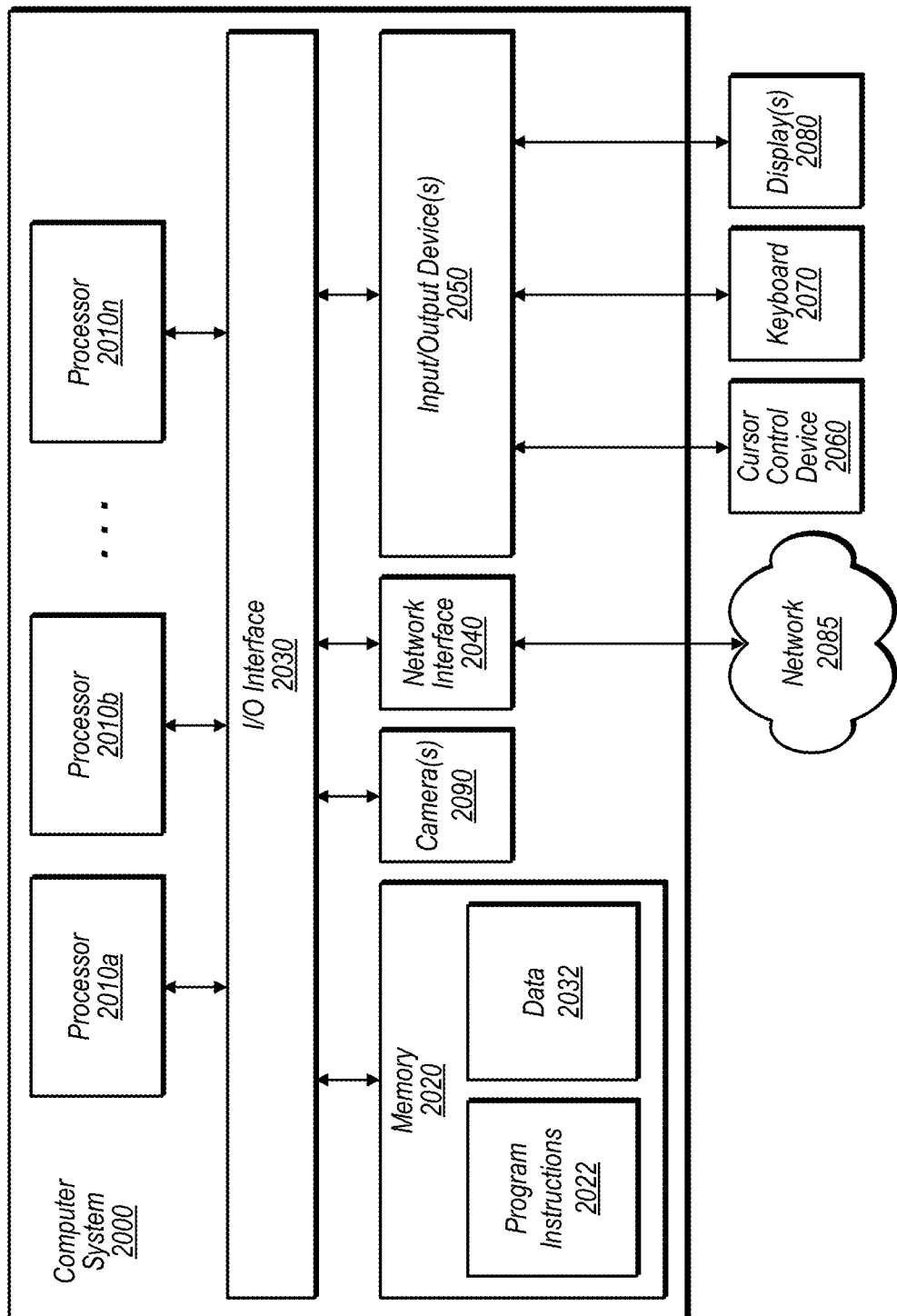
FIG. 13 illustrates an example computer system that may be used in embodiments.

Embodiments of the folded camera as described herein may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. FIG. 13 illustrates an example device that may include one or more small form factor cameras that use embodiments of the camera as described herein. However, note that aspects of the camera (e.g., the lens system, prisms, and photosensor) may be scaled up or down to provide cameras with larger or smaller package sizes. In addition, embodiments of the camera may be implemented as stand-alone digital cameras. In addition to still (single frame capture) camera applications, embodiments of the camera may be adapted for use in video camera applications.

Figure 2:
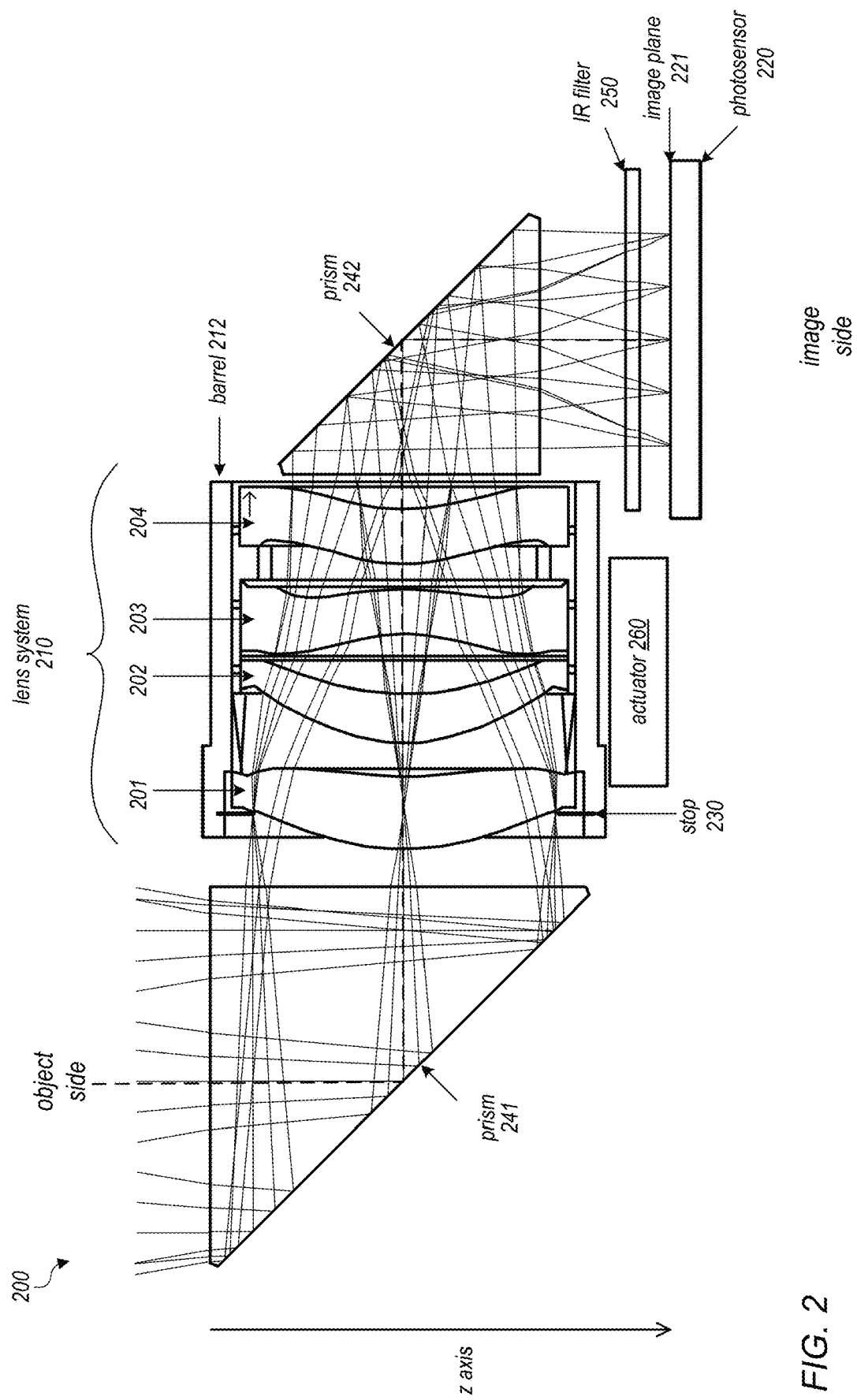
FIG. 2 is a cross-sectional illustration of a folded camera with four refractive lens elements in the lens system, according to some embodiments.

FIG. 2 is a cross-sectional illustration of a folded camera with four refractive lens elements in the lens system, according to some embodiments. FIG. 2 shows an example camera 200 including two prisms 241 and 242 that "fold" the optical axis of the camera 200 and an example embodiment of a lens system 210 with four refractive lens elements 201-204 located between the prisms 241 and 242. The lens elements 201-204 are mounted in a lens barrel 212, with an aperture stop 230 located at or in front of the first (object side) lens element 201. While embodiments are generally described as using prisms to fold the optical axis, other methods may be used to fold the optical axis, including but not limited to mirrors. The first prism 241 folds the optical axis from a first axis (AX 1) that is parallel to the incoming light direction to a second axis (AX 2) that is orthogonal to the incoming light direction. The second prism 242 folds the optical axis from the second axis (AX 2) that is orthogonal to the incoming light direction to a third axis (AX 3) that is parallel to the incoming light direction.

The camera 200 also includes a photosensor 220, and may also include an optional infrared (IR) filter. A camera 200 including an embodiment of the lens system 210 as illustrated in FIG. 2 may, for example, be implemented in portable electronic devices such as mobile phones and tablets. Embodiments of the lens system 210 may provide a low F-number (<=2.4), 3× optical zoom, and high resolution imaging.

In some embodiments, the camera 200 may include an actuator 260 component or components configured to move the lens system 210 on (parallel to) the second axis (AX 2) relative to and independently of the prisms 241 and 242 to provide autofocus functionality for the camera 200. In some embodiments, the actuator 260 component(s) may instead or also be configured to move the lens system 210 on one or more axes orthogonal to the second axis (AX 2) relative to and independently of the prisms 241 and 242 to provide optical image stabilization (OIS) functionality for the camera 200. Various types of mechanical, magnetic, or other actuator technology may be used in various embodiments. In some embodiments, one or both of the prisms 241 and 242 may be translated with respect to the second axis (AX 2) independently of the lens system 210 and/or tilted with respect to the second axis (AX 2) independently of the lens system 210, for example to provide OIS functionality for the camera 200 or to shift the image formed at an image plane 221 at the photosensor 220.

As shown in the example of FIG. 2, embodiments of the lens system 210 may include four lens elements 201-204 with refractive power. Note, however, that some embodiments may include more or fewer refractive lens elements. Some embodiments of the lens system 210 may provide a 35 mm equivalent focal length in the range of 80-200 mm and less than 6.5 mm of Z-height to fit in a wide variety of portable electronics devices. With proper arrangement of materials and lens powers, embodiments of the lens system 210 are capable of capturing high brightness photographs or video frames with near diffraction-limited image quality.

As illustrated in the example camera 200 of FIG. 2, the lens system 210 may include four lens elements 201-204 with refractive power, in order from the object side to the image side of the camera 200: a first lens element 201 with positive refractive power; a second lens element 202 with positive refractive power; a third lens element 203 with negative refractive power and an aspheric shape to correct chromatic aberration and field curvature; and a fourth lens element 204 with a meniscus shape to correct field curvature and provide a low F-number. At least one of the refractive lens elements may be formed of lightweight polymer or plastic material. At least two of the refractive lens elements may be formed of materials with different Abbe numbers. An aperture stop 230 may be located in the lens system 210 at the first lens element 201 for controlling the brightness of the camera 200. Note that the power order, shape, or other optical characteristics of the refractive lens elements may be different in some embodiments, and some embodiments may include more or fewer refractive lens elements.

In some embodiments, the camera 200 includes two right-angle prisms 241 and 242 to change the direction of the light passing through the camera 200. In some embodiments, one or both of the prisms may be shifted or tilted relative to the position of the lens system 210 to provide autofocus and/or OIS functionality for the camera 200. In some embodiments, the aperture stop 230 is integrated in the lens system 210 to control brightness in the camera 200. Integrating the stop 230 in the lens system 210 enables the lens system 210 to be isolated from and moved independently with relation to the prisms 241 and 242. In some embodiments, the aperture stop 230 may be fixed; the diameter of the stop 230 may be chosen according to system requirements. However, in some embodiments, the aperture stop may be adjustable.

In some embodiments, the camera 200 includes an IR filter 250, for example located between light folding element 242 and photosensor 220, to reduce or eliminate interference of environmental noises on the sensor 220.

Camera 200 Z-height is sensitive to barrel 212 diameter. In some embodiments, to provide a desired Z-height for a particular camera 200 application, the structure of the barrel 212 may be modified. For example, in various embodiments of a camera 200, the barrel 212 may be truncated, may be tapered, may be single-sided, and/or may have a reverse assembly structure.

Figure 3:
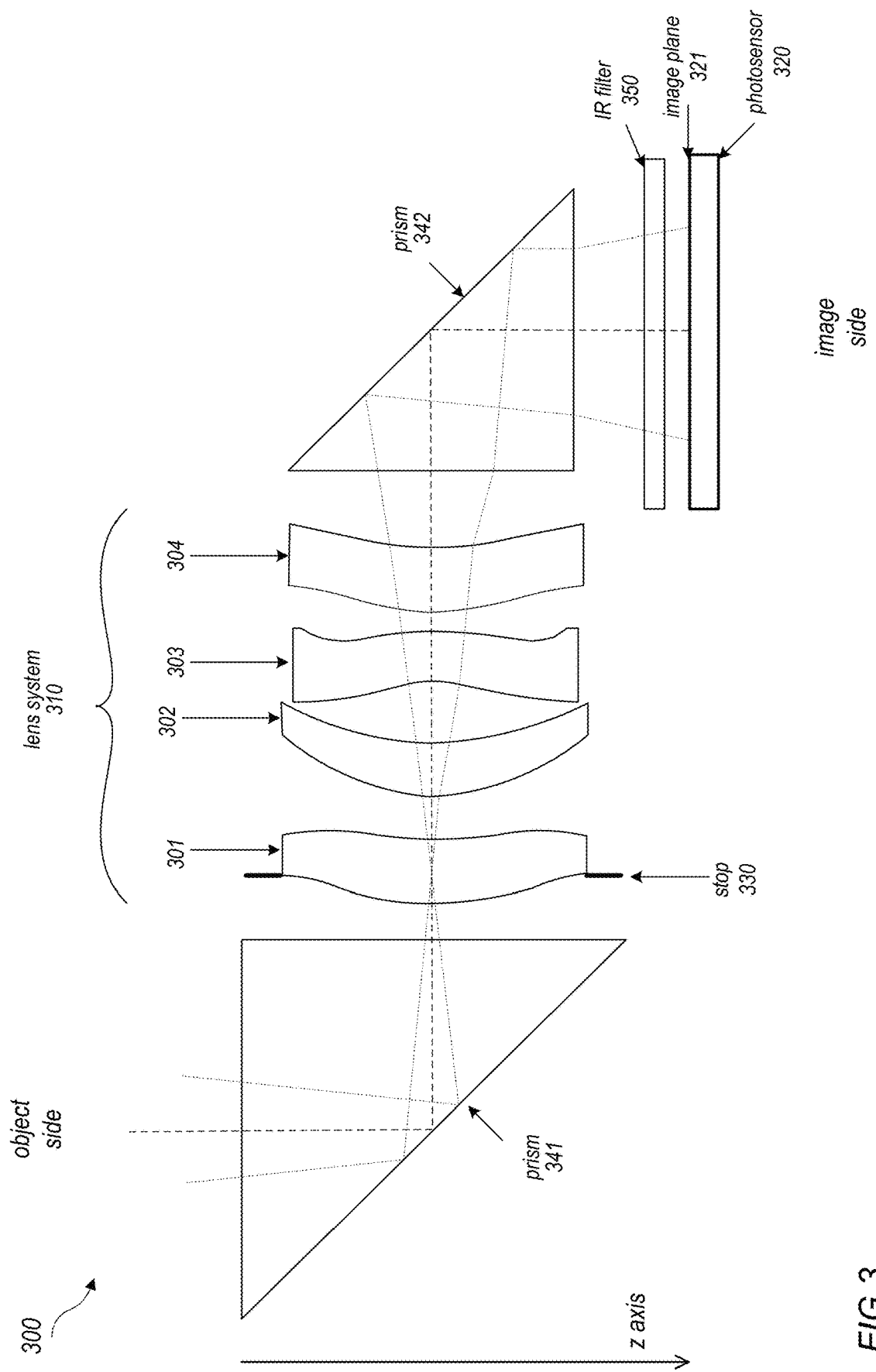
FIG. 3 is a diagram illustrating a lens system that includes four refractive lens elements, according to some embodiments.

FIG. 3 is a diagram illustrating a lens system that includes four refractive lens elements, according to some embodiments. A camera 300 may include a photosensor 320, two light folding elements (e.g., prisms 341 and 342), and an independent lens system 310 located between the two prisms 341 and 342 that includes an aperture stop 330 and lens elements with refractive power mounted in a lens barrel. The prisms provide a "folded" optical axis for the camera, for example to reduce the Z-height of the camera. The lens system 310 includes an aperture stop 330 to control system brightness while maintaining an integrated lens system that is independent of the two prisms 341 and 342. The camera 300 may, but does not necessarily, include an infrared (IR) filter 350, for example located between the second prism 342 and the photosensor 320.

The example lens system 310 shown in FIG. 3 includes a lens stack consisting of four refractive elements 301-304 that provide a low F-number (<=F/2.4), 3× optical zoom, and high resolution imaging. Lenses 301 and 302 both have positive refractive power for light converging while splitting the spherical aberration contributions of each lens 301 and 302. Lens 303 has negative refractive power, and an aspheric shape to correct chromatic aberration and field curvature. Lens 304 is a meniscus lens to correct field curvature and enable low F-number operation of the camera 300. In some embodiments, lens 304 may have low positive refractive power.

In some embodiments, the lens system 310 may be shifted along AX 2 independently of the two prisms 341 and 342 to allow refocusing of the lens system 310 between Infinity conjugate and Macro conjugate. In some embodiments, the lens system 310 may be shifted on one or more axes orthogonal to AX 2 to provide OIS functionality for the camera 300. In various embodiments, lens elements 301, 302, 303, and/or 304 may be round/circular or rectangular, or some other shape. Note that in various embodiments, a lens system 310 may include more or fewer refractive lens elements, and the lens elements may be configured or arranged differently.

In some embodiments, one or both of the prisms 341 and 342 may be shifted independently of the lens system 310 along one or more axes by a mechanical actuator mechanism to facilitate autofocus functionality for the lens system 310 between Infinity conjugate and Macro conjugate. In some embodiments, one or both of the prisms 341 and 342 may be translated with respect to the second axis (AX 2) independently of the lens system 310 and/or tilted with respect to the second axis (AX 2) independently of the lens system 342 by a mechanical actuator mechanism, for example to provide OIS functionality for the camera 300 or to shift the image formed at an image plane 321 at the photosensor 320.

Figure 4A:
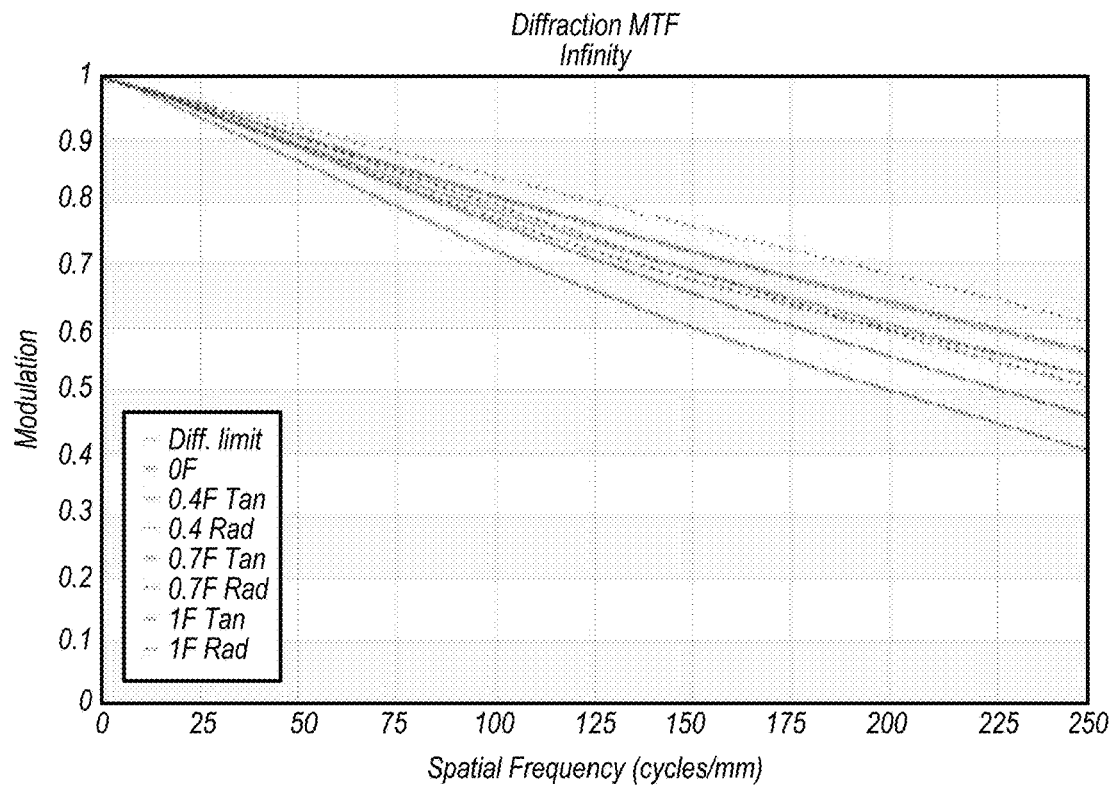
FIG. 4A is a graph illustrating the modulation transfer function (MTF) for a lens system as illustrated in FIG. 3 at infinity conjugate.
Figure 4B:
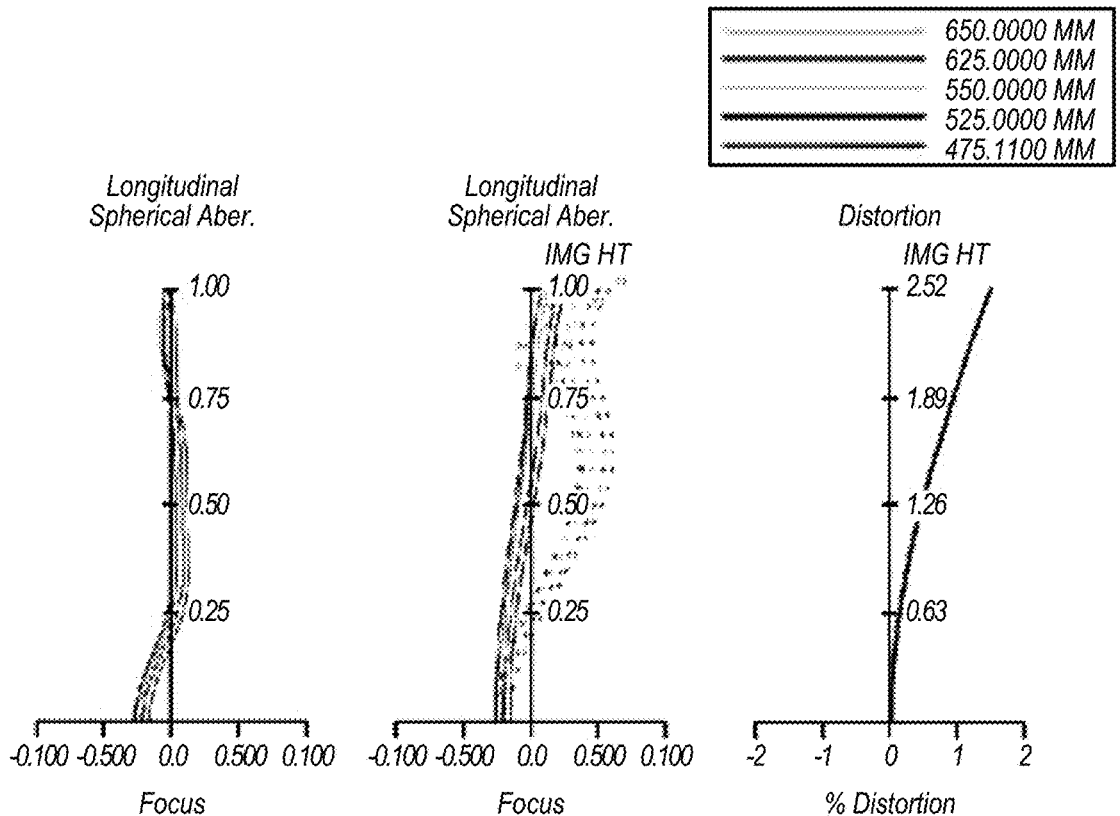
FIG. 4B shows longitudinal spherical aberration, astigmatic field curves, and distortion for a lens system as illustrated in FIG. 3 at infinity conjugate.

FIG. 4A is a graph illustrating the modulation transfer function (MTF) for a lens system as illustrated in FIG. 3 at infinity conjugate. FIG. 4B shows longitudinal spherical aberration, astigmatic field curves, and distortion for a lens system as illustrated in FIG. 3 at infinity conjugate.

Figure 5A:
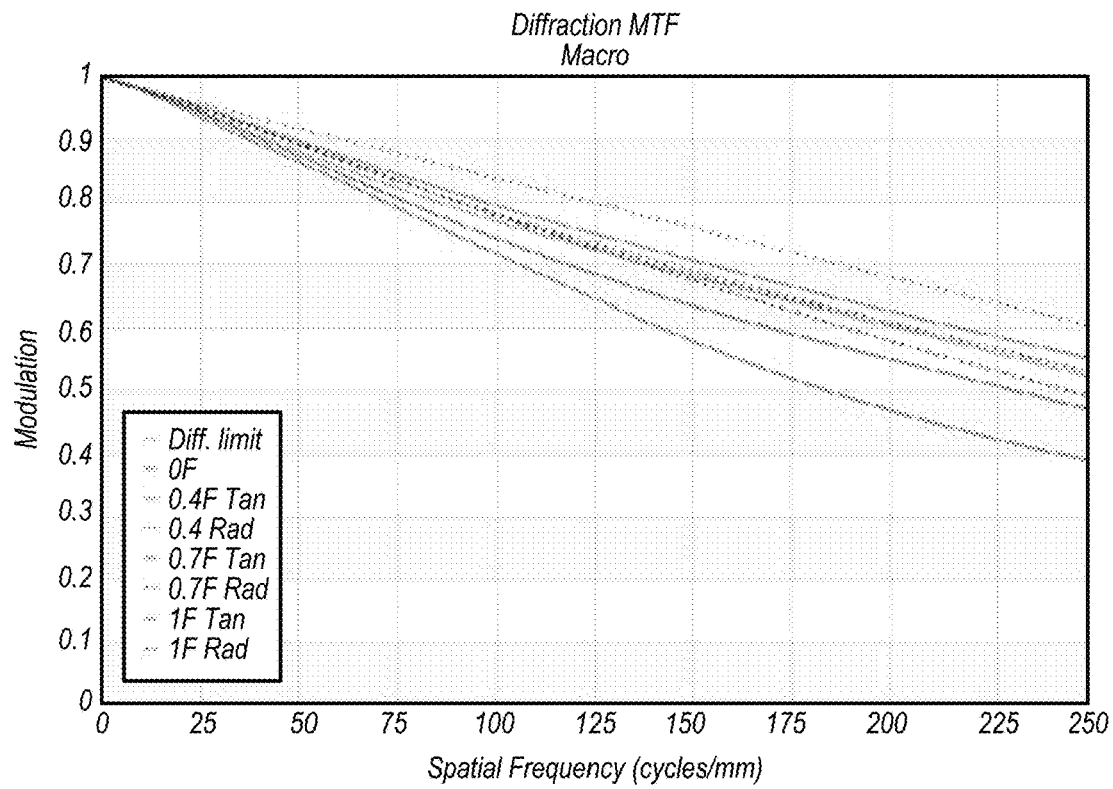
FIG. 5A is a graph illustrating the modulation transfer function (MTF) for a lens system as illustrated in FIG. 3 at macro conjugate.
Figure 5B:
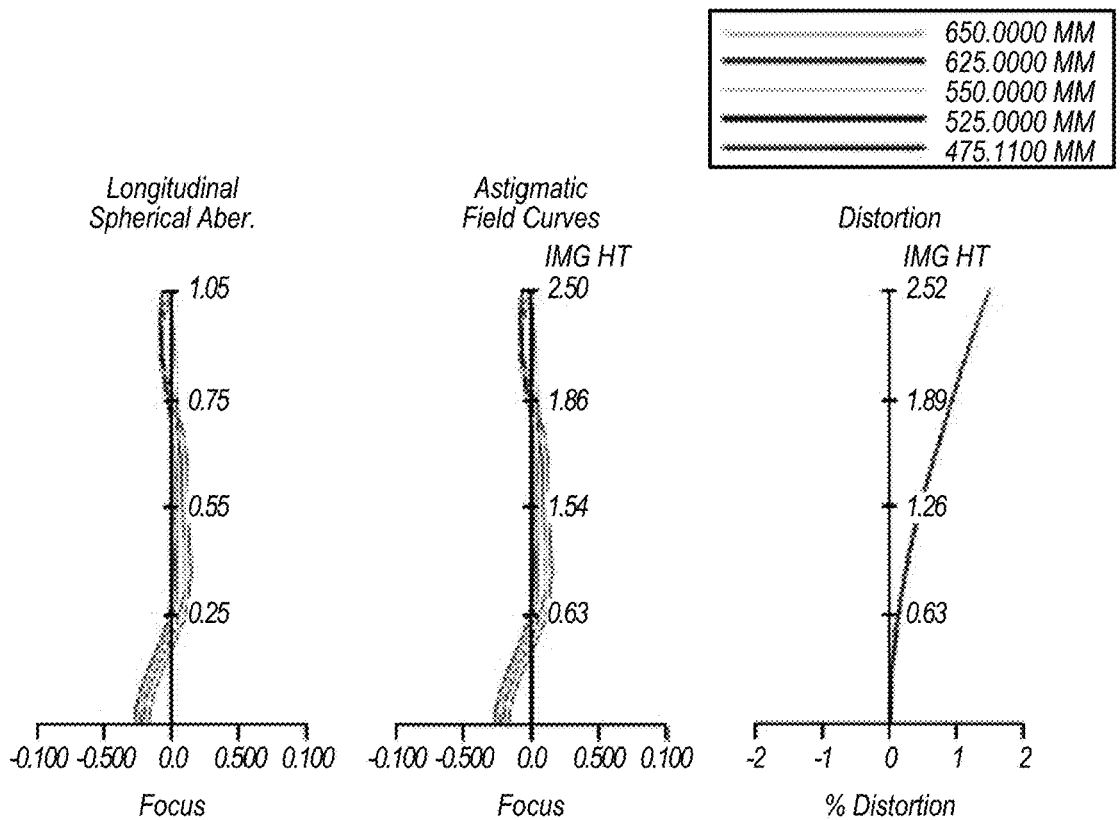
FIG. 5B shows longitudinal spherical aberration, astigmatic field curves, and distortion for a lens system as illustrated in FIG. 3 at macro conjugate.

FIG. 5A is a graph illustrating the modulation transfer function (MTF) for a lens system as illustrated in FIG. 3 at macro conjugate. FIG. 5B shows longitudinal spherical aberration, astigmatic field curves, and distortion for a lens system as illustrated in FIG. 3 at macro conjugate.

Figure 6:
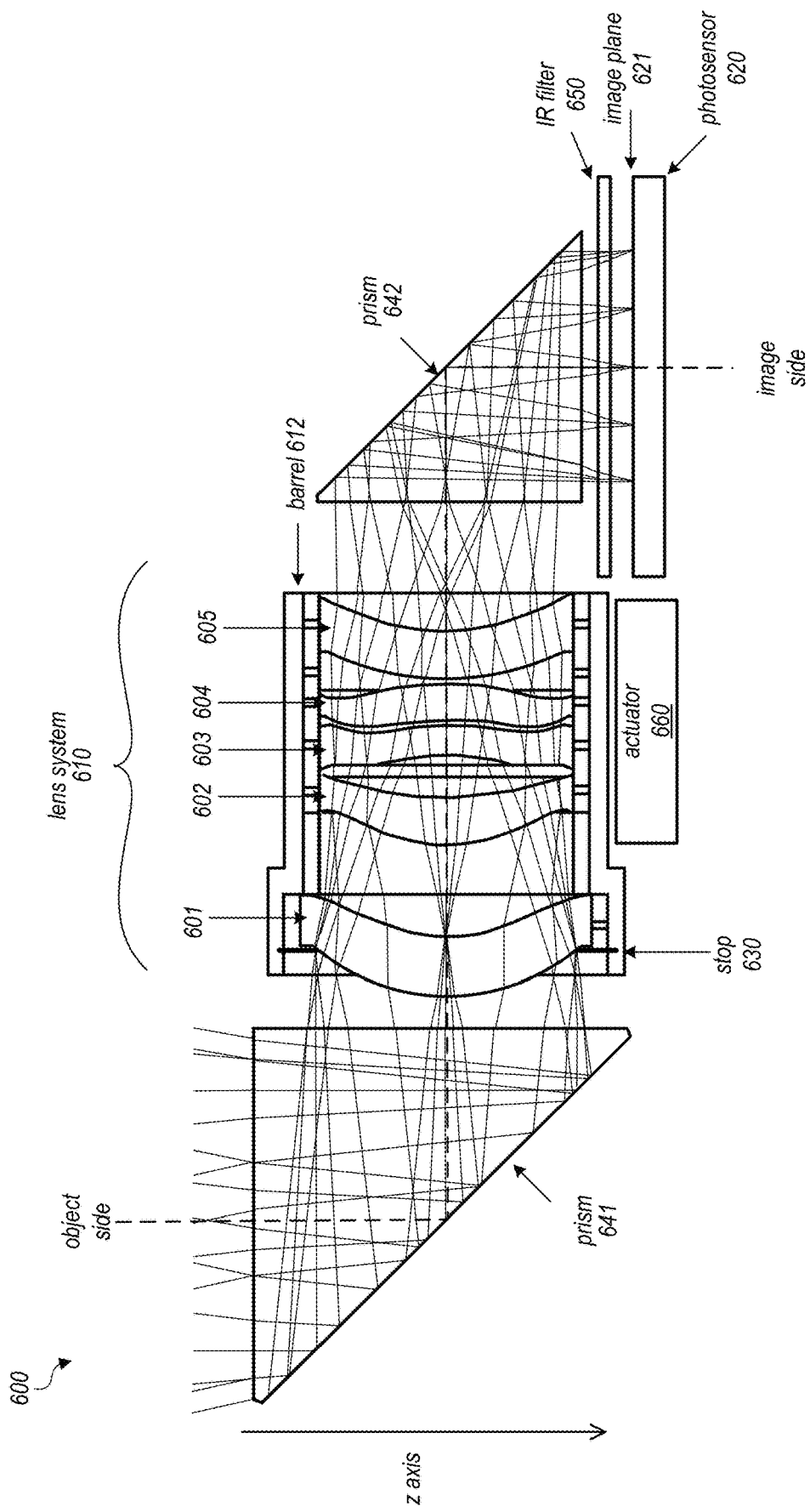
FIG. 6 is a cross-sectional illustration of a folded camera with five refractive lens elements in the lens system, according to some embodiments.

FIG. 6 is a cross-sectional illustration of a folded camera with five refractive lens elements in the lens system, according to some embodiments. FIG. 6 shows an example camera 600 including two prisms 641 and 642 that "fold" the optical axis of the camera 600 and an example embodiment of a lens system 610 with five refractive lens elements 601-605 located between the prisms 641 and 642. The lens elements 601-605 are mounted in a lens barrel 612, with an aperture stop 630 located at or in front of the first (object side) lens element 601. While embodiments are generally described as using prisms to fold the optical axis, other methods may be used to fold the optical axis, including but not limited to mirrors. The first prism 641 folds the optical axis from a first axis (AX 1) that is parallel to the incoming light direction to a second axis (AX 2) that is orthogonal to the incoming light direction. The second prism 642 folds the optical axis from the second axis (AX 2) that is orthogonal to the incoming light direction to a third axis (AX 3) that is parallel to the incoming light direction.

The camera 600 also includes a photosensor 620, and may also include an optional infrared (IR) filter. A camera 600 including an embodiment of the lens system 610 as illustrated in FIG. 6 may, for example, be implemented in portable electronic devices such as mobile phones and tablets. Embodiments of the lens system 610 may provide a low F-number (<=2.4), 3× optical zoom, and high resolution imaging.

In some embodiments, the camera 600 may include an actuator 660 component or components configured to move the lens system 610 on (parallel to) the second axis (AX 2) relative to and independently of the prisms 641 and 642 to provide autofocus functionality for the camera 600. In some embodiments, the actuator 660 component(s) may instead or also be configured to move the lens system 610 on one or more axes orthogonal to the second axis (AX 2) relative to and independently of the prisms 641 and 642 to provide optical image stabilization (OIS) functionality for the camera 600. Various types of mechanical, magnetic, or other actuator technology may be used in various embodiments. In some embodiments, one or both of the prisms 641 and 642 may be translated with respect to the second axis (AX 2) independently of the lens system 610 and/or tilted with respect to the second axis (AX 2) independently of the lens system 610, for example to provide OIS functionality for the camera 600 or to shift the image formed at an image plane 621 at the photosensor 620.

As shown in the example of FIG. 6, embodiments of the lens system 610 may include five lens elements 601-605 with refractive power. Note, however, that some embodiments may include more or fewer refractive lens elements. Some embodiments of the lens system 610 may provide a 35 mm equivalent focal length in the range of 80-600 mm and less than 6.5 mm of Z-height to fit in a wide variety of portable electronics devices. With proper arrangement of materials and lens powers, embodiments of the lens system 610 are capable of capturing high brightness photographs or video frames with near diffraction-limited image quality.

As illustrated in the example camera 600 of FIG. 6, the lens system 610 may include five lens elements 601-605 with refractive power, in order from the object side to the image side of the camera 600: a first lens element 601 with positive refractive power; a second lens element 602 with positive refractive power; a third lens element 603 with negative refractive power and an aspheric shape to correct chromatic aberration and field curvature; a fourth aspheric lens element 604 configured as an air-space doublet with lens element 603 that assists in the aberration correction provided by lens element 603; and a fifth lens element 605 with a meniscus shape to correct field curvature and provide a low F-number. At least one of the refractive lens elements may be formed of lightweight polymer or plastic material. At least two of the refractive lens elements may be formed of materials with different Abbe numbers. An aperture stop 630 may be located in the lens system 610 at the first lens element 601 for controlling the brightness of the camera 600. Note that the power order, shape, or other optical characteristics of the refractive lens elements may be different in some embodiments, and some embodiments may include more or fewer refractive lens elements.

In some embodiments, the camera 600 includes two right-angle prisms 641 and 642 to change the direction of the light passing through the camera 600. In some embodiments, one or both of the prisms may be shifted or tilted relative to the position of the lens system 610 to provide autofocus and/or OIS functionality for the camera 600. In some embodiments, the aperture stop 630 is integrated in the lens system 610 to control brightness in the camera 600. Integrating the stop 630 in the lens system 610 enables the lens system 610 to be isolated from and moved independently with relation to the prisms 641 and 642. In some embodiments, the aperture stop 630 may be fixed; the diameter of the stop 630 may be chosen according to system requirements. However, in some embodiments, the aperture stop may be adjustable.

In some embodiments, the camera 600 includes an IR filter 650, for example located between light folding element 642 and photosensor 620, to reduce or eliminate interference of environmental noises on the sensor 620.

Camera 600 Z-height is sensitive to barrel 612 diameter. In some embodiments, to provide a desired Z-height for a particular camera 600 application, the structure of the barrel 612 may be modified. For example, in various embodiments of a camera 600, the barrel 612 may be truncated, may be tapered, may be single-sided, and/or may have a reverse assembly structure.

Figure 7:
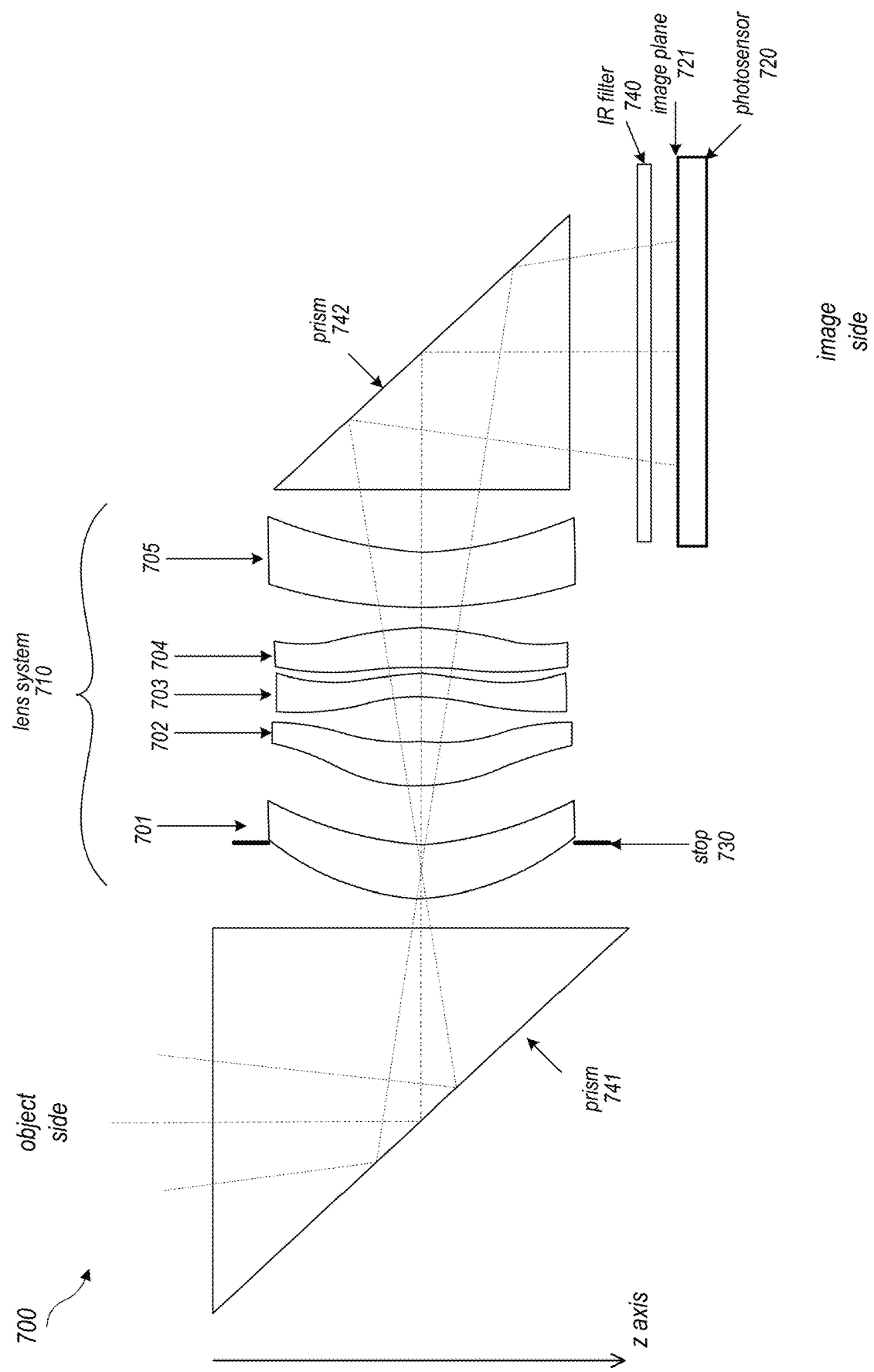
FIG. 7 is a diagram illustrating a lens system that includes five refractive lens elements, according to some embodiments.

FIG. 7 is a diagram illustrating a lens system that includes five refractive lens elements in the lens system, according to some embodiments. A camera 700 may include a photosensor 720, two light folding elements (e.g., prisms 741 and 742), and an independent lens system 710 located between the two prisms 741 and 742 that includes an aperture stop 730 and lens elements with refractive power mounted in a lens barrel. The prisms provide a "folded" optical axis for the camera, for example to reduce the Z-height of the camera. The lens system 710 includes an aperture stop 730 to control system brightness while maintaining an integrated lens system that is independent of the two prisms 741 and 742. The camera 700 may, but does not necessarily, include an infrared (IR) filter 750, for example located between the second prism 742 and the photosensor 720.

The example lens system 710 shown in FIG. 7 includes a lens stack consisting of five refractive elements 701-705 that provide a low F-number (<=F/2.4), 3× optical zoom, and high resolution imaging. Lenses 701 and 702 both have positive refractive power for light converging while splitting the spherical aberration contributions of each lens 701 and 702. Lens 703 has negative refractive power, and an aspheric shape to correct chromatic aberration and field curvature. Lens 704 works as an air space doublet with lens 703 to provide aberration correction. Lens 705 is a meniscus lens to correct field curvature and enable low F-number operation of the camera 700. In some embodiments, lens 705 may have low positive refractive power.

In some embodiments, the lens system 710 may be shifted along AX 2 independently of the two prisms 741 and 742 to allow refocusing of the lens system 710 between Infinity conjugate and Macro conjugate. In some embodiments, the lens system 710 may be shifted on one or more axes orthogonal to AX 2 to provide OIS functionality for the camera 700. In various embodiments, lens elements 701, 702, 703, 704, and/or 705 may be round/circular or rectangular, or some other shape. Note that in various embodiments, a lens system 710 may include more or fewer refractive lens elements, and the lens elements may be configured or arranged differently.

In some embodiments, one or both of the prisms 741 and 742 may be shifted independently of the lens system 710 along one or more axes by a mechanical actuator mechanism to facilitate autofocus functionality for the lens system 710. In some embodiments, one or both of the prisms 741 and 742 may be translated with respect to the second axis (AX 2) independently of the lens system 710 and/or tilted with respect to the second axis (AX 2) independently of the lens system 742 by a mechanical actuator mechanism, for example to provide OIS functionality for the camera 700 or to shift the image formed at an image plane 721 at the photosensor 720.

Figure 8A:
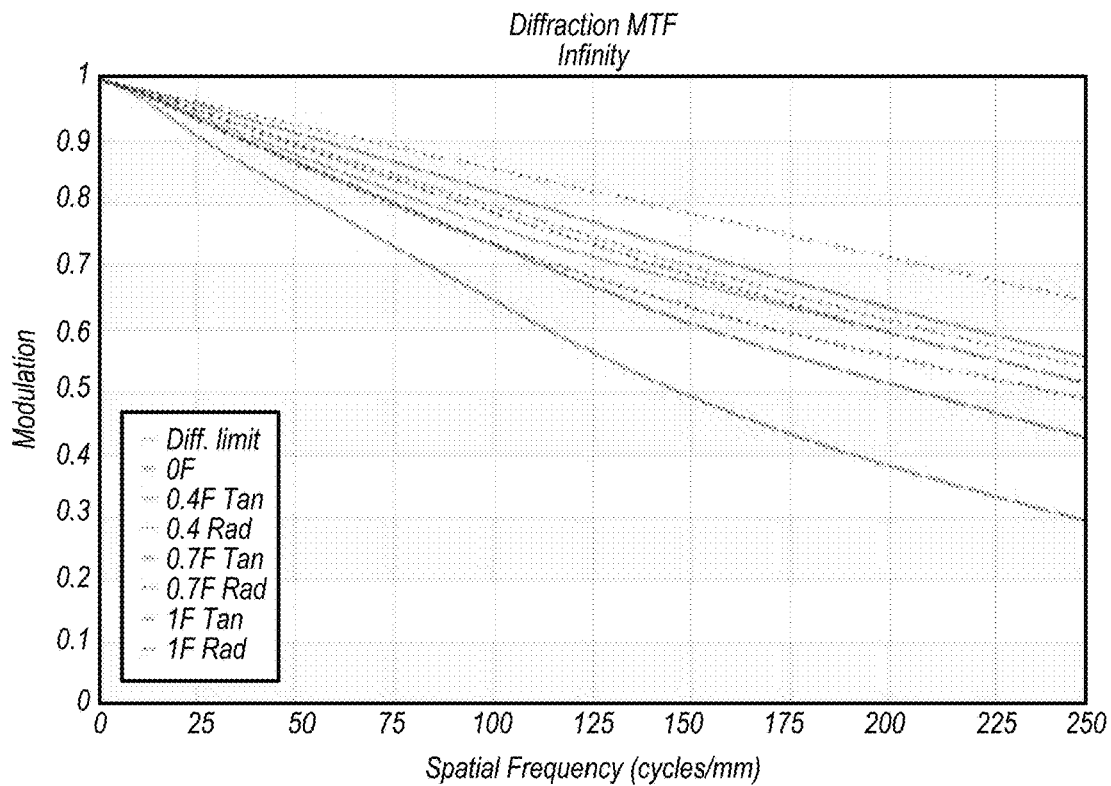
FIG. 8A is a graph illustrating the modulation transfer function (MTF) for a lens system as illustrated in FIG. 7 at infinity conjugate.
Figure 8B:
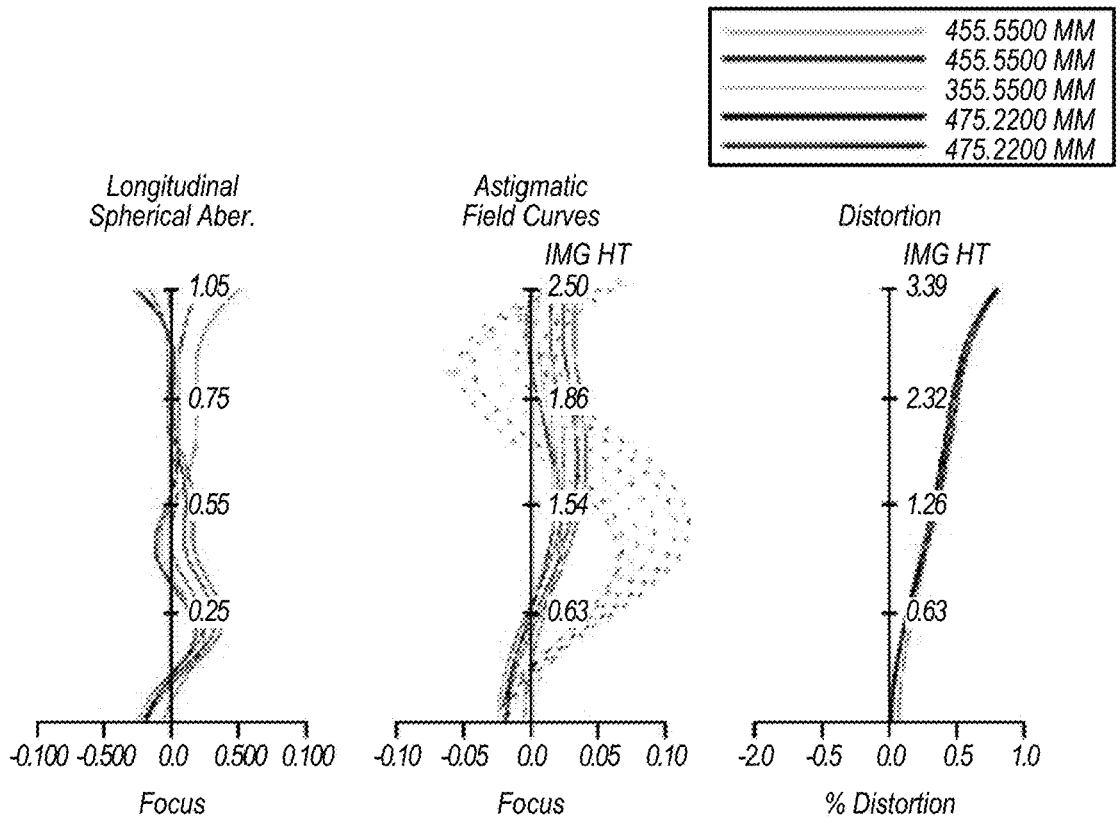
FIG. 8B shows longitudinal spherical aberration, astigmatic field curves, and distortion for a lens system as illustrated in FIG. 7 at infinity conjugate.

FIG. 8A is a graph illustrating the modulation transfer function (MTF) for a lens system as illustrated in FIG. 7 at infinity conjugate. FIG. 8B shows longitudinal spherical aberration, astigmatic field curves, and distortion for a lens system as illustrated in FIG. 7 at infinity conjugate.

Figure 9A:
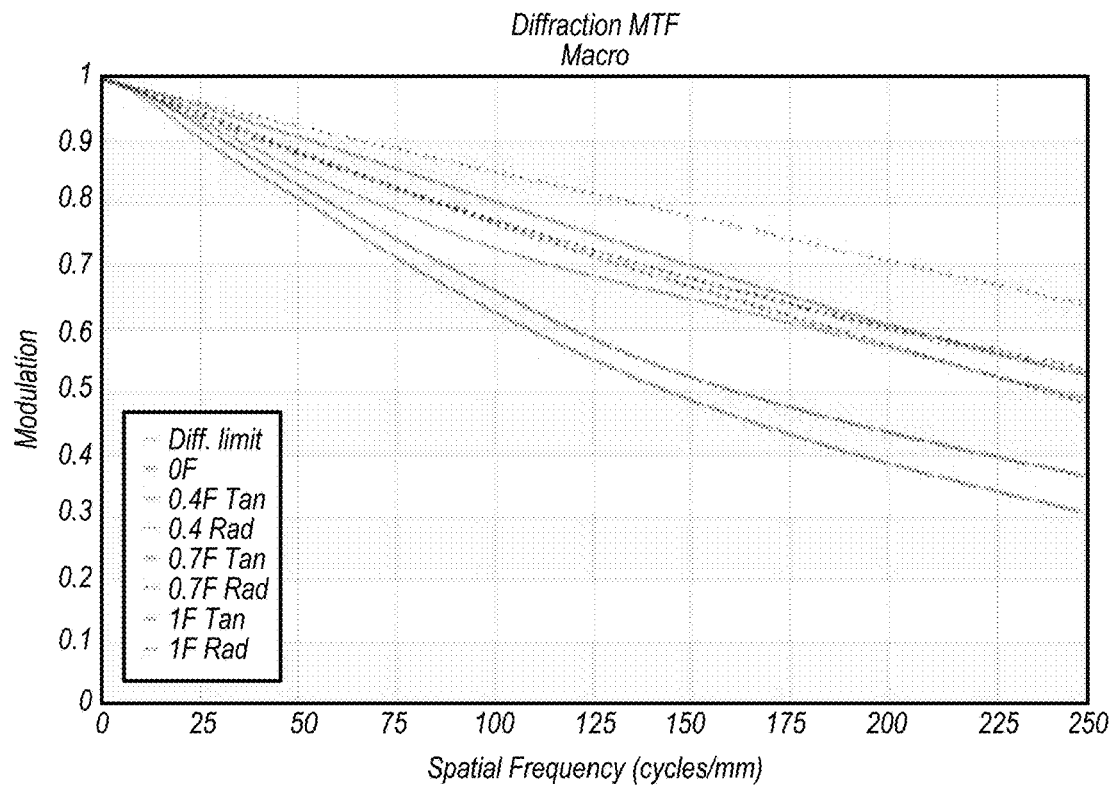
FIG. 9A is a graph illustrating the modulation transfer function (MTF) for a lens system as illustrated in FIG. 7 at macro conjugate.
Figure 9B:
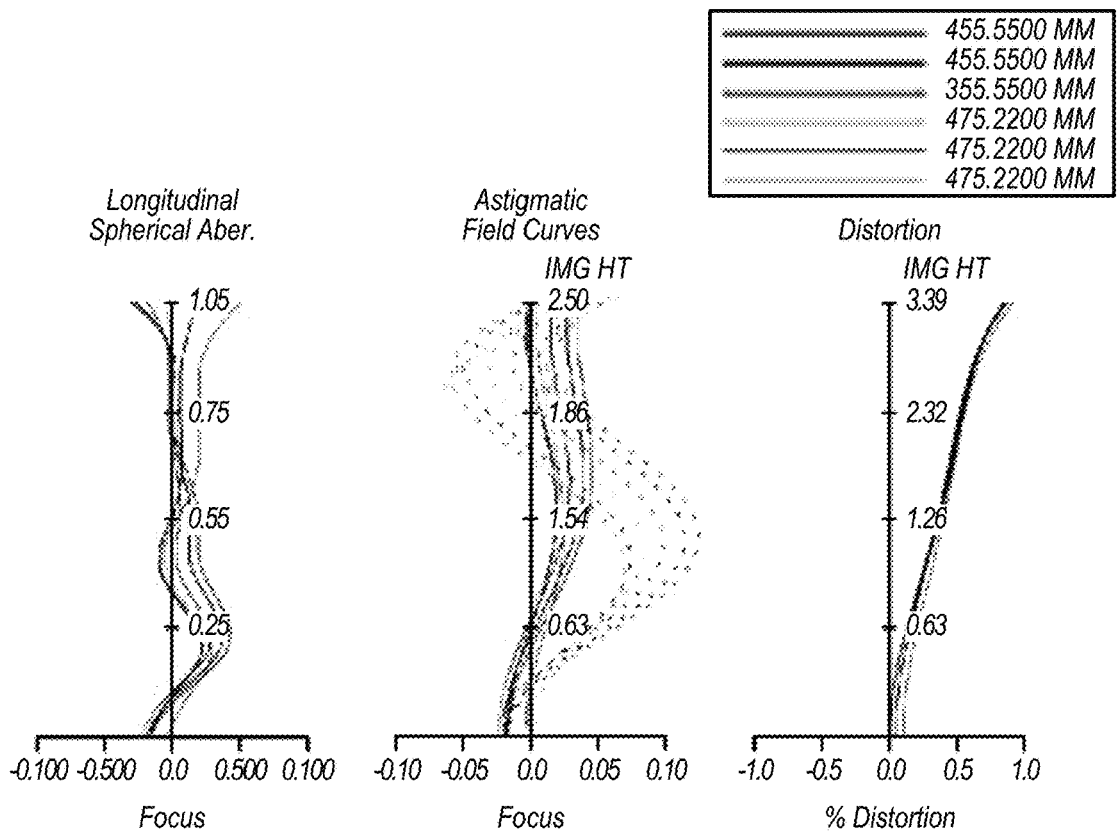
FIG. 9B shows longitudinal spherical aberration, astigmatic field curves, and distortion for a lens system as illustrated in FIG. 7 at macro conjugate.

FIG. 9A is a graph illustrating the modulation transfer function (MTF) for a lens system as illustrated in FIG. 7 at macro conjugate. FIG. 9B shows longitudinal spherical aberration, astigmatic field curves, and distortion for a lens system as illustrated in FIG. 7 at macro conjugate.

Figure 10:
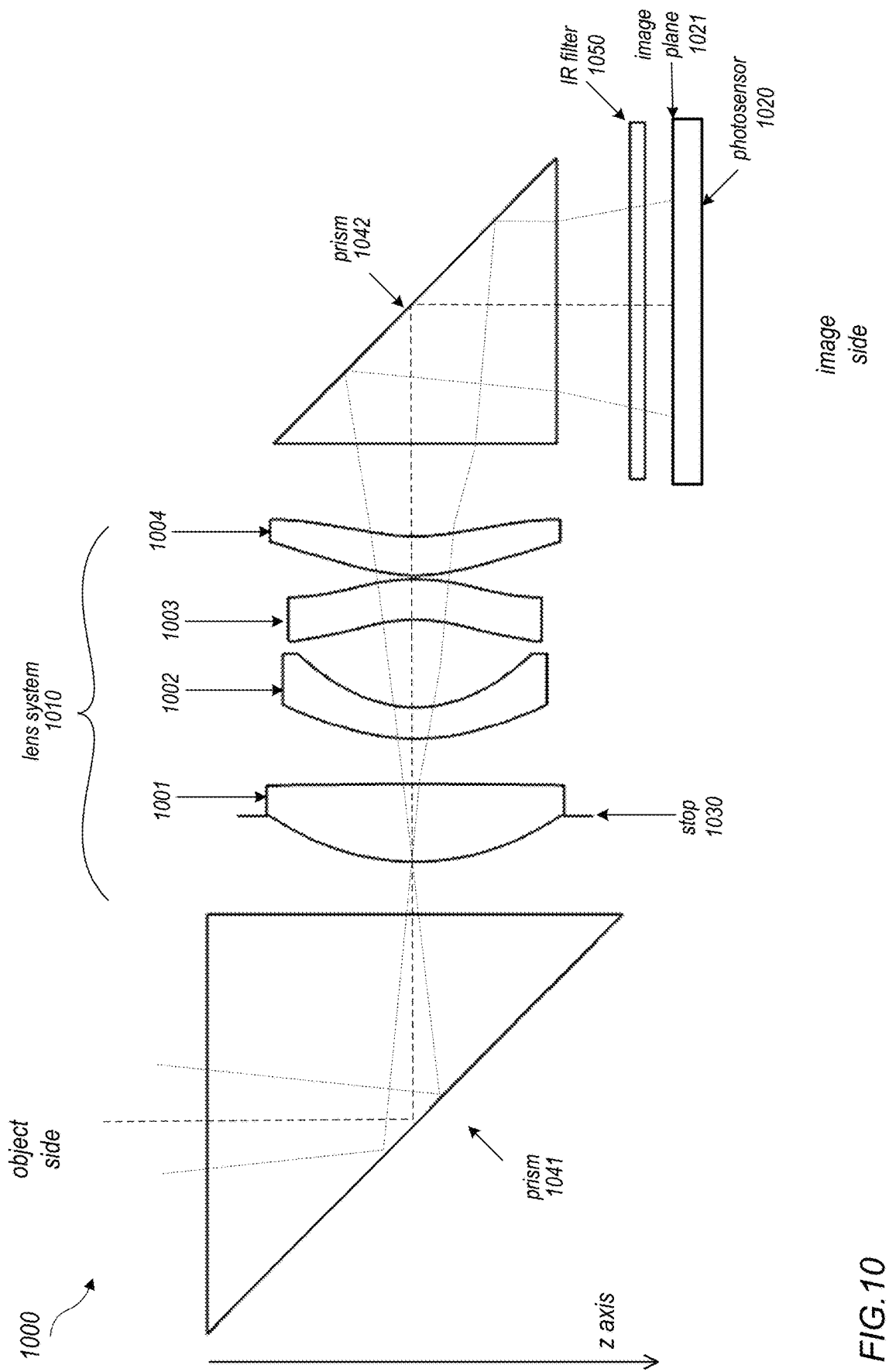
FIG. 10 is a diagram illustrating a lens system that includes four refractive lens elements, according to some embodiments.

FIG. 10 is a diagram illustrating a lens system that includes four refractive lens elements, according to some embodiments. A camera 1000 may include a photosensor 1020, two light folding elements (e.g., prisms 1041 and 1042), and an independent lens system 1010 located between the two prisms 1041 and 1042 that includes an aperture stop 1030 and lens elements with refractive power mounted in a lens barrel. The prisms provide a "folded" optical axis for the camera, for example to reduce the Z-height of the camera. The lens system 1010 includes an aperture stop 1030 to control system brightness while maintaining an integrated lens system that is independent of the two prisms 1041 and 1042. The camera 1000 may, but does not necessarily, include an infrared (IR) filter 1050, for example located between the second prism 1042 and the photosensor 1020.

The example lens system 1010 shown in FIG. 10 includes a lens stack consisting of four refractive elements 1001-1004 that provide a low F-number (<=F/2.4), 3× optical zoom, and high resolution imaging. Lens 1001 has positive refractive power for light converging while being aspheric to control spherical aberration. Lens 1002 has negative refractive power and has an Abbe number that is less than 30. Lens 1003 is a meniscus lens, and has a concave object-side surface in the paraxial region and a convex image-side surface in the paraxial region. Lens 1004 is a meniscus lens to correct field curvature and enable low F-number operation of the camera 1000.

In some embodiments, the lens system 1010 may be shifted along the second axis (AX 2) independently of the two prisms 1041 and 1042 to allow refocusing of the lens system 1010 between Infinity conjugate and Macro conjugate. In some embodiments, the lens system 1010 may be shifted on one or more axes orthogonal to AX 2 to provide OIS functionality for the camera 1000. In various embodiments, lens elements 1001, 1002, 1003, and/or 1004 may be round/circular or rectangular, or some other shape. Note that in various embodiments, a lens system 1010 may include more or fewer refractive lens elements, and the lens elements may be configured or arranged differently.

In some embodiments, one or both of the prisms 1041 and 1042 may be shifted independently of the lens system 1010 along one or more axes by a mechanical actuator mechanism to facilitate autofocus functionality for the lens system 1010. In some embodiments, one or both of the prisms 1041 and 1042 may be translated with respect to the second axis (AX 2) independently of the lens system 1010 and/or tilted with respect to the second axis (AX 2) independently of the lens system 1042 by a mechanical actuator mechanism, for example to provide OIS functionality for the camera 1000 or to shift the image formed at an image plane 1021 at the photosensor 1020.

Figure 11A:
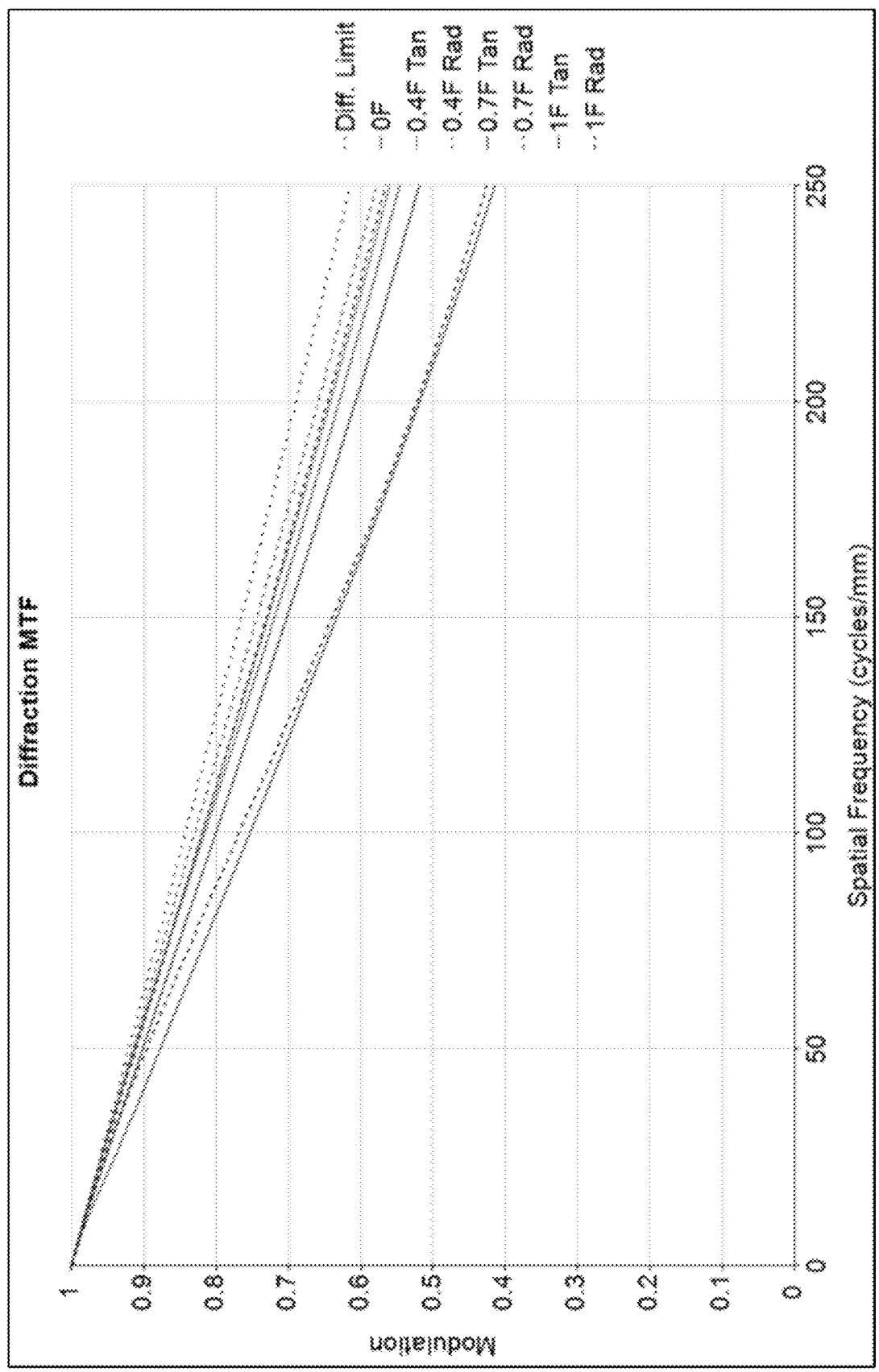
FIG. 11A is a graph illustrating the modulation transfer function (MTF) for a lens system as illustrated in FIG. 10.
Figure 11B:
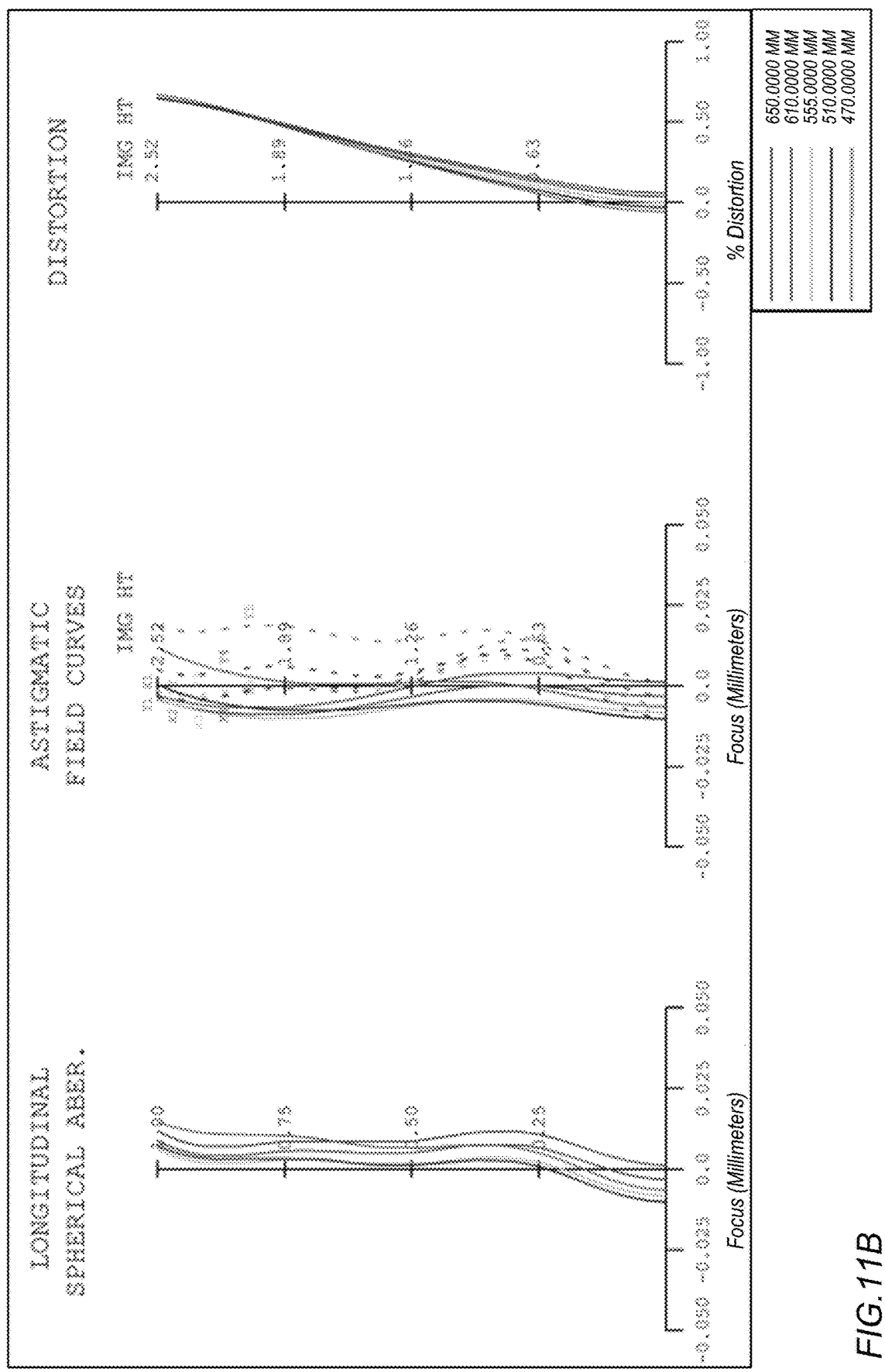
FIG. 11B shows longitudinal spherical aberration, astigmatic field curves, and distortion for a lens system as illustrated in FIG. 10.

FIG. 11A is a graph illustrating the modulation transfer function (MTF) for a lens system as illustrated in FIG. 10. FIG. 11B shows longitudinal spherical aberration, astigmatic field curves, and distortion for a lens system as illustrated in FIG. 10.

Example Flowchart

Figure 12:
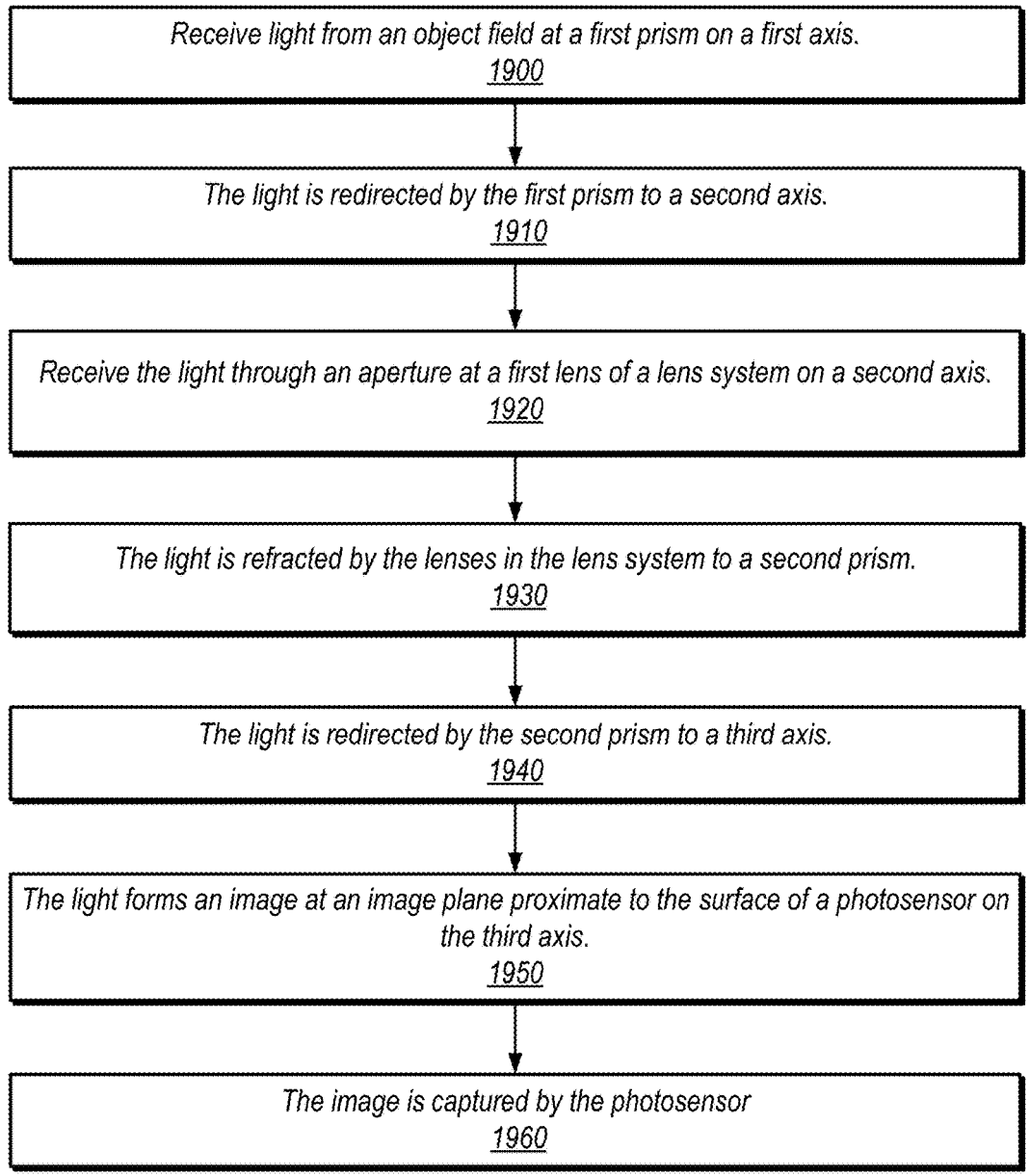
FIG. 12 is a flowchart of a method for capturing images using embodiments of a camera as illustrated in FIGS. 1 through 11B, according to some embodiments.

FIG. 12 is a flowchart of a method for capturing images using embodiments of a camera as illustrated in FIGS. 1 through 11B, according to some embodiments. As indicated at 1900, light from an object field in front of the camera is received at a first light folding element such as a prism on a first axis. As indicated at 1910, the light is redirected by the first prism to a second axis. As indicated at 1920, the light is received through an aperture at a first lens of a lens system on the second axis. As indicated at 1930, the light is refracted by one or more lens elements of the lens system on the second axis to a second light folding element such as a prism. As indicated at 1940, the light is redirected by the second light folding element to a third axis. As indicated at 1950, the light forms an image at an image plane at or near the surface of a sensor module on the third axis. As indicated at 1960, the image is captured by the photosensor. The lens system is independent of the first and second prisms. The camera may include an actuator component configured to move the lens system on one or more axes independently of the prisms to provide autofocus and/or OIS functionality for the camera.

While not shown in FIG. 12, in some embodiments, the light may pass through an infrared filter that may for example be located between the second light folding element and the photosensor. In some embodiments, the aperture stop may be fixed; the diameter of the stop may be chosen according to system requirements. However, in some embodiments, the aperture stop may be adjustable. In some embodiments, one or both of the prisms are fixed. However, in some embodiments, one or both of the prisms may be shifted or tilted with respect to the second axis and independently of the lens system.

In some embodiments, the components of the lens system referred to in FIG. 12 may be configured as illustrated in any of FIG. 2, 3, 6, 7 or 10. However, note that variations on the examples given in the Figures are possible while achieving similar optical results.

Example Computing Device

FIG. 13 illustrates an example computing device, referred to as computer system 2000, that may include or host embodiments of a camera with a lens system as illustrated in FIGS. 1 through 12. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1 through 12, which may also be coupled to I/O interface 2030, or one or more cameras as described above with respect to FIGS. 1 through 12 along with one or more other cameras such as conventional wide-field cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 16, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical system, comprising:
a first light folding element;
a second light folding element; and
a lens system comprising one or more lens elements located between the first light folding element and the second light folding element;
wherein the first light folding element redirects light from an object field from a first axis to the lens system on a second axis;
wherein the one or more lens elements in the lens system refract the light to the second light folding element;
wherein the second light folding element redirects the light from the second axis onto a third axis to form an image of the object field at an image plane;
wherein the lens system is movable on two or more axes independently of the first and second light folding elements, and
wherein F-number of the lens system is less than or equal to 2.4, a 35 mm equivalent focal length of the lens system is in a range 80-200 mm, and Z-height of the lens system <6.5 mm.

2. The optical system as recited in claim 1, wherein the lens system provides a 3× optical zoom.

3. The optical system as recited in claim 1, wherein at least one of the first and second light folding elements is a prism.

4. The optical system as recited in claim 1, wherein the lens system is movable on the second axis to provide autofocus functionality for the optical system.

5. The optical system as recited in claim 1, wherein the lens system is movable on one or more axes orthogonal to the second axis to provide optical image stabilization functionality for the optical system.

6. The optical system as recited in claim 1, wherein one or both of the light folding elements can be translated with respect to the second axis independently of the lens system.

7. The optical system as recited in claim 1, wherein one or both of the light folding elements can be tilted with respect to the second axis independently of the lens system.

8. A camera, comprising:
a photosensor configured to capture light projected onto a surface of the photosensor;
a first light folding element that redirects light received from an object field from a first axis to a second axis;
a lens system comprising one or more refractive lens elements that refract the light on the second axis;
a second light folding element that redirects the light refracted by the lens system from the second axis to a third axis to form an image of the object field at an image plane at or near a surface of the photosensor; and
wherein F-number of the lens system is less than or equal to 2.4, a 35 mm equivalent focal length of the lens system is in a range 80-200 mm, and Z-height of the lens system <6.5 mm.

9. The camera as recited in claim 8, wherein the lens system is movable on two or more axes independently of the first and second light folding elements.

10. The camera as recited in claim 8, further comprising an actuator component configured to move the lens system on two or more axes independently of the first and second light folding elements.

11. The camera as recited in claim 8, wherein the lens system is movable on the second axis to provide autofocus functionality for the camera.

12. The camera as recited in claim 8, wherein the lens system is movable on one or more axes orthogonal to the second axis to provide optical image stabilization functionality for the camera.

13. The camera as recited in claim 8, wherein the camera further includes one or more actuator components configured to translate or tilt one or both of the light folding elements with respect to the second axis independently of the lens system.

14. The camera as recited in claim 8, wherein the lens system provides a 3× optical zoom.

15. A device to capture one or more images, comprising:
one or more processors;
one or more cameras; and
a memory comprising program instructions executable by at least one of the one or more processors to control operations of the one or more cameras;
wherein at least one of the one or more cameras is a camera comprising:
a photosensor configured to capture light projected onto a surface of the photosensor;
a first light folding element that redirects light received from an object field from a first axis to a second axis;
a lens system comprising one or more refractive lens elements that refract the light on the second axis;
a second light folding element that redirects the light refracted by the lens system from the second axis to a third axis to form an image of the object field at an image plane at or near a surface of the photosensor; and
wherein F-number of the lens system is less than or equal to 2.4, a 35 mm equivalent focal length of the lens system is in a range 80-200 mm, and Z-height of the lens system <6.5 mm.

16. The device as recited in claim 15, further comprising an actuator component configured to move the lens system on two or more axes independently of the first and second light folding elements.

17. The device as recited in claim 15, wherein the camera further includes one or more actuator components configured to translate or tilt one or both of the light folding elements with respect to the second axis independently of the lens system.

18. The device as recited in claim 15, wherein the lens system is movable on one or more axes orthogonal to the second axis to provide optical image stabilization functionality for the camera.

19. The device as recited in claim 15, wherein the lens system is movable on the second axis to provide autofocus functionality for the camera.

20. The device as recited in claim 15, wherein the lens system provides a 3× optical zoom.

* * * * *